(12) United States Patent
Lenzing et al.

(10) Patent No.: US 8,804,855 B2
(45) Date of Patent: Aug. 12, 2014

(54) NETWORK INFRASTRUCTURE FOR MOBILE MACHINES WHICH CAN BE USED IN AREAS AT RISK OF EXPLOSION

(75) Inventors: Markus Lenzing, Ludinghausen (DE); Henner Ruschkamp, Lunen (DE); Karsten Schwinne, Hamm (DE); Johannes Wesselmann, Dortmund (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 51 days.

(21) Appl. No.: 13/581,458

(22) PCT Filed: Mar. 3, 2011

(86) PCT No.: PCT/IB2011/050911
§ 371 (c)(1),
(2), (4) Date: Aug. 27, 2012

(87) PCT Pub. No.: WO2011/110983
PCT Pub. Date: Sep. 15, 2011

(65) Prior Publication Data
US 2012/0320997 A1 Dec. 20, 2012

(30) Foreign Application Priority Data
Mar. 10, 2010 (DE) .................... 20 2010 000 351 U

(51) Int. Cl.
*H04B 3/00* (2006.01)

(52) U.S. Cl.
USPC ........... 375/257; 375/219; 375/222; 375/295; 375/316; 375/377

(58) Field of Classification Search
CPC ............... E21F 17/18; F25B 2309/006; F25B 2309/1408; F25B 2309/1413; F25B 2309/14181; F25B 2309/14241; F25B 9/10; F25B 9/14; F25B 9/145; B64C 2201/027; B64C 2201/084; B64C 39/024; B64C 39/064; F25D 19/006; H04L 25/0266; G05D 23/136; G21C 7/14; G21Y 2002/206; G21Y 2002/304; G21Y 2004/30; H01H 1/16
USPC ......... 375/219, 222, 224, 229, 257, 259, 269, 375/270, 285, 295, 302, 316, 332, 340, 350, 375/354, 377
See application file for complete search history.

(56) References Cited

U.S. PATENT DOCUMENTS

| | | | | |
|---|---|---|---|---|
| 6,037,857 | A * | 3/2000 | Behrens et al. | 375/257 |
| 6,294,732 | B1 * | 9/2001 | Hoffmann et al. | 174/50 |
| 6,614,634 | B1 * | 9/2003 | Westerfeld et al. | 361/62 |

(Continued)

FOREIGN PATENT DOCUMENTS

| | | |
|---|---|---|
| DE | 20 2010 000 110 U1 | 7/2011 |
| GB | 2 209 551 A | 5/1989 |
| WO | 2009/018891 A1 | 2/2009 |

*Primary Examiner* — Hirdepal Singh
(74) *Attorney, Agent, or Firm* — Foley & Lardner LLP

(57) ABSTRACT

A network infrastructure for mobile machines which are usable in explosive areas, having inherently safe participants and not inherently safe network participants the latter being arranged in pressure-resistant housings. The machine has at least one controller for actuating at least one not inherently safe participant. In order to provide a network infrastructure which avoids the drawbacks of the prior art, the machine has, outside the pressure-resistant housing for the first controller, at least one second, inherently safe controller for actuating at least one inherently safe participant, wherein the first controller forms a data distributor for a plurality of not inherently safe participants and the second controller forms a data distributor for a plurality of inherently safe participants, and wherein the first data distributor and the second data distributor are linked via an electrically decoupled data communication link.

19 Claims, 2 Drawing Sheets

(56) References Cited

U.S. PATENT DOCUMENTS

| | | | |
|---|---|---|---|
| 7,312,716 B2* | 12/2007 | Kothari et al. | 340/635 |
| 7,898,786 B2* | 3/2011 | Schmidt | 361/119 |
| 2002/0161479 A1* | 10/2002 | Mathewes et al. | 700/245 |
| 2006/0077612 A1* | 4/2006 | Kothari et al. | 361/115 |
| 2008/0013226 A1* | 1/2008 | Kirst | 361/18 |
| 2008/0180226 A1 | 7/2008 | Schmidt | |
| 2010/0321485 A1* | 12/2010 | Pool | 348/82 |
| 2012/0008533 A1* | 1/2012 | Barrett et al. | 370/310 |

* cited by examiner

NETWORK INFRASTRUCTURE FOR MOBILE MACHINES WHICH CAN BE USED IN AREAS AT RISK OF EXPLOSION

The invention relates to a network infrastructure for mobile machines which can be used in explosive area, having inherently safe network participants and having not inherently safe network participants which are arranged in pressure-resistant housings, wherein the machine has at least one controller, arranged in a pressure-resistant housing, for actuating at least one not inherently safe participant.

BACKGROUND OF THE INVENTION

In areas at risk of explosion, such as in coal mining, there are now similarly high automation ambitions as above ground. In the case of machine control and monitoring of mobile machines which are used in areas at risk of explosion, centrally arranged control consoles are generally used which are positioned in areas in which there are no problems with protection against explosion. In order to be able to control and monitor even complex automation sequences from above-ground control consoles, for example, a large number of different sensors and actuators, including test and diagnosis systems, are needed which have to be used in the area which is at risk of explosion. The high demands on productivity and reliability and also the evermore frequent application of powerful field bus protocols, for example, places ever greater demands on the structure ability and performance of the network infrastructure for communication between and control of the individual machine groups.

Ordinary network infrastructures for control systems for mobile machines used in areas at risk of explosion comprise a single, central controller. This individual controller controls and monitors all machine functions and controls the flow of information and data in the network. All input and output signals and also the sensor and actuator systems are captured and controlled directly by the central controller. This requires complex and therefore error-prone wiring of the individual appliance to the central unit. If the central controller fails, there is the risk that the entire communication or control function within the network may become inoperational.

The protection against explosion which is required in mining means that, in a network for explosive area, the network is divided into inherently safe network participants, which meet the stringent requirements on inherent safety for the respective protection against explosion, and not inherently safe network participants, which are therefore arranged in pressure-resistant housings, the pressure-resistant housings being used to ensure that the network participants which are not approved without the pressure-resistant housing can nevertheless be used in the area at risk of explosion. This separation between not inherently safe and inherently safe network participants in combination with the star-shaped orientation of the network increases the wiring complexity considerably.

SUMMARY OF THE INVENTION

It is an object of the invention to provide a network infrastructure for explosive areas which diminishes or avoids the aforementioned weak points.

This object and others is achieved in a network infrastructure according to the invention by virtue of the machine having, outside the pressure-resistant housing for the first controller, at least one second, inherently safe controller for actuating at least one inherently safe participant, wherein the first controller forms a data distributor for a plurality of not inherently safe participants and the second controller forms a data distributor for a plurality of inherently safe network participants, and wherein the first data distributor and the second data distributor have an electrically decoupled data communication link between them.

The network infrastructure or topology according to the invention is in the form of a distributed system having a plurality of data distributors, as a result of which the wiring complexity can be significantly reduced. The provision of at least one data distributor for the inherently safe participants and of a separate data distributor for the not inherently safe participants allows the pressure-resistant housing to be provided with a minimized number of bushings, for example, even though wired data communication between the controllers is nevertheless possible.

The data communication link can be made via electrically conductive data communication lines which are preferably copper-based and are electrically decoupled by means of an additional barrier. By contrast, in one preferred refinement, the data communication link comprises a glass-fibre line or optical waveguide. In a particularly advantageous refinement, the data communication link for the second controller is lead through the pressure-resistant housing, surrounding the first controller, via a single pressure-resistant outlet. In addition to the electrically decoupled data communication link, it would be possible to provide a power supply connection between the first controller and the second controller, said electrical power supply connection being reduced as far as possible to a single bushing on the pressure-resistant housing in this case too. To increase the availability of the network, at least the data communication link may be of redundant design. If a fault occurs within individual connection paths, the data distributor can advantageously change over to an operational communication link.

In one preferred refinement, the first controller has, preferably exclusively, not inherently safe network participants connected to it which are possibly arranged in separate, pressure-resistant housings. Within a pressure-resistant housing, it is also possible for a plurality of not inherently safe network participants to be arranged together. With further preference, the inherently safe, second controller has exclusively inherently safe network participants connected to it.

The second controller, which forms a data distributor for a plurality of inherently safe participants, may particularly be in the form of an inherently safe network switch having combined data and power supply connections. Such a network switch having combined data and power supply connections and an advantageously usable, inherently safe Ethernet network interface is described in detail in DE 20 2010 000 110 from the applicant, the disclosure content of which is referred to in order to supplement the present disclosure. To this end, the network interface for areas at risk of explosion may be provided particularly with a resistor network for radio-frequency power decoupling and with a capacitor network for DC power decoupling in respect of other network interfaces, wherein the capacitor network is respectively arranged on the connector connection side and the resistor network is respectively arranged on the electronics side relative to a transmission element of the network interface, so that the resistor and capacitor networks have the respective transmission element connected between them. The second controller forming a data distributor may also have another design, however.

With further preference, the first controller may have at least one further not inherently safe controller, which is arranged in a pressure-resistant housing, connected to it or able to be connected to it, or the inherently safe, second controller has at least one further, inherently safe controller able to be connected to it or connected to it, in which case the additional controllers preferably likewise have data distributor functions. The network infrastructure according the invention is therefore preferably not limited to two controllers, namely a controller for inherently safe network participants and a controller for not inherently safe participants, but rather can be extended arbitrarily, in principle, by additional controllers.

For the data distributor function, it is particularly advantageous if the first controller and the second controller are each provided with at least one microprocessor. It is also advantageous if the inherently safe participants and the not inherently safe participants communicate with one another in a dedicated address range. The first controller may be connected to a static offboard control unit via a data coupler for the purpose of data interchange. It is particularly advantageous if both the network participants and the static offboard control unit and/or possibly the control center act in the same address range. Depending on the size of the network, a separate address range may also be necessary.

The individual participants in the network infrastructure and the data distributors are preferably designed such that data can be interchanged at any time by any participant with any other participant, the communication being effected via a "point-to-point" connection. Each participant may be set up such that it can make decisions independently and autonomously and/or can request necessary information specifically from possibly any other participant. At least the controllers which form the data distributors should preferably have connected to them only those participants that have microelectronics.

A network infrastructure can grow approximately arbitrarily, preferably in a linear structure or ring structure, by virtue of the concatenation of further participants, to which end controllers with a data distributor function can be arranged directly in the area at risk of explosion and/or in pressure-resistant housings for not inherently safe participants. The participants may also be input/output units (I/O units) which can possibly perform a plurality of functions such as reading in sensor data and/or actuating actuators such as valves or the like.

These and other objects, aspects, features, developments and advantages of the invention of this application will become apparent to those skilled in the art upon a reading of the Detailed Description of Embodiments set forth below taken together with the drawings which will be described in the next section.

DETAILED DESCRIPTION OF EMBODIMENTS

Figure 1:
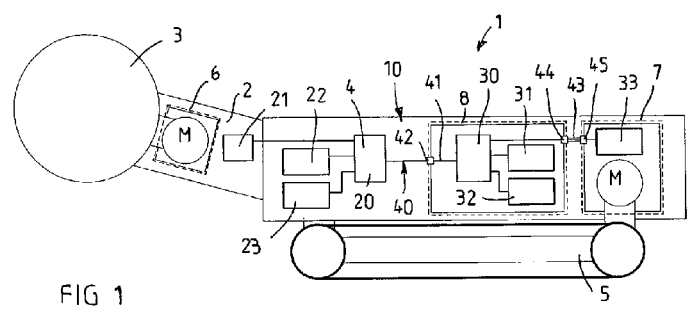
FIG. 1 schematically shows the design of an infrastructure according to the invention using a mobile machine for use in areas at risk of explosion.

Referring now to the drawings wherein the showings are for the purpose of illustrating preferred and alternative embodiments of the invention only and not for the purpose of limiting same, FIG. 1 shows a mobile machine 1, in this case in the form of what is known as a continuous miner, schematically in highly simplified form. The machine 1 comprises a cutting cylinder 3 mounted on a pivot arm 2, a machine housing 4 and a running gear 5 which can be used to move the machine 1 into underground areas at risk of gas explosion, for example. The cutting cylinder 3 is driven by means of a motor M which, in order to meet the requirements for protection against explosion, is arranged in a first pressure-resistant housing 6. The running gear 5 has an associated separate motor M which is arranged in a second pressure-resistant housing 7. The actuation of the two motors M for the cutting cylinder 3 and the running gear 5, but also the actuation of other, possibly moving units, such as, for example, the pivot arm 2 on the machine, and also the data communication with other machine components, such as hydraulic actuators, or the poling of sensors are effected by means of a network infrastructure or network topology for appropriate mobile machines 1 which is denoted as a whole by reference symbol 10. In this case, the network infrastructure 10 comprises a plurality of inherently safe network participants 21, 22, 23, which are all approved for use in areas at risk of explosion and which are arbitrary inherently safe appliances, in principle. By way of example, the inherently safe network participants 21-23 may form input/output units which are used to read in a plurality of inputs from sensors (not shown), for example, or to actuate actuators such as valves (not shown). The inherently safe network participants 21, 22, 23 may be of different design, may be equipped with different functions or different functionalities and preferably have powerful microelectronics which can be used to perform metrological and regulatory tasks and to process information, as appropriate.

In the network infrastructure 10, all inherently safe network participants 21, 22, 23 have an associated inherently safe controller 20 which, since, like the inherently safe network participants 21, 22, 23, it meets the requirements for protection against explosion which are in place for the respective area of use of the machine 1, can be arranged at any position inside or outside the machine housing 4 of the machine 1. The inherently safe controller 20 forms a data distributor in the area at risk of explosion, with the individual network participants 21, 22, 23 being able to interchange information or data with one another, or being able to request information, using the data distribution function of the controller 20.

The mobile machine 4 also comprises at least one further controller for at least one not inherently safe network participant 31 arranged on it. In the exemplary embodiment shown in FIG. 1, the controller 30 is arranged in a pressure-resistant housing 8 which is moved along with the machine 1, and the pressure-resistant housing 8 simultaneously has a plurality of not inherently safe network participants 31, 32 arranged in it. Like the controller 20 for the inherently safe participants, the controller 30 for the not inherently safe network participants 31-33 forms a data distributor.

In the exemplary embodiment shown, there is only a single data communication link 40 between the first controller 30 for the not inherently safe network participants 31, 32, which is arranged in the pressure-resistant housing 8, and the second, inherently safe controller 20 with a data distributor function for the inherently safe network participants 21, 22, 23. The wired data communication link 40 for the network infrastructure 10 preferably comprises an optical waveguide 41 which is routed out of the pressure-resistant housing 8 by means of a pressure-resistant bushing 42. By way of example, the optical waveguide 41 may be connected to suitable optical waveguide connections (not shown) on the controllers 20, 30 in order to connect the two controllers 20, 30 to one another in electrically decoupled fashion. In parallel with the optical waveguide 41, there could also additionally be a power supply line between the two controllers 20, 30.

Since, in the mobile machine 1, the motor M for the running gear 5 is arranged in a separate pressure-resistant housing 7 together with a not inherently safe network participant 33, which may comprise an input/output appliance with a microprocessor, for example, there is a further data communication link between the controller 30 and the further, not inherently safe network participant 33 via a separate cable or preferably via a separate optical waveguide 43. The optical waveguide 43 is coupled out of the pressure-resistant housing 8 through a separate, pressure-resistant bushing passage 44 and is then in turn coupled into the other pressure-resistant housing 7 via a pressure-resistant passage 45.

Both controllers 20, 30 may have an associated approximately arbitrary number of further network participants. Each inherently safe network participant 21, 22, 23 or else each not inherently safe network participant 31, 32, 33 may respectively be of modular design and be individually compiled from various functional chips and/or have a microprocessor or the like in order to be able to perform the necessary functions, calculations and actuation operations.

Figure 2:
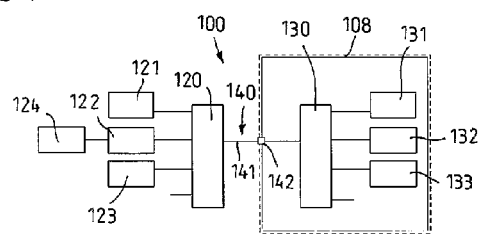
FIG. 2 shows an infrastructure according to the invention based on a second exemplary embodiment.

FIG. 2 shows a network infrastructure 100 based on a second exemplary embodiment. To simplify the illustration, the mobile machine is not shown and only a single pressure-resistant housing 108 is shown which contains the first controller 130 with the not inherently safe network participants 131, 132, 133 and possibly, as indicated, further not inherently safe network participants. Arranged outside the pressure-resistant housing 108 is likewise only a single inherently safe controller 120, which has exclusively inherently safe network participants 121, 122, 123 connected to it. The inherently safe network participant 122 has a further inherently safe network participant 124 connected to it, as shown by way of example. The network participants 122, 124 form a concatenation in the network infrastructure 100 in a linear structure, which can be extended possibly arbitrarily. Both the first controller 130 for the not inherently safe network participants 131-133 in the pressure-resistant housing 108 and the second controller 120 for the inherently safe network participants 121-124 form a data distributor by means of which the respective network participants 121-124 can interchange data with one another and/or with the network participants 131-133, or vice versa, or can query or request data from one another. The pressure-resistant housing 108, which contains possibly all not inherently safe appliances or network participants 130-133, has a single passage 142 for an optical waveguide 141 as a data communication link 140.

Figure 3:
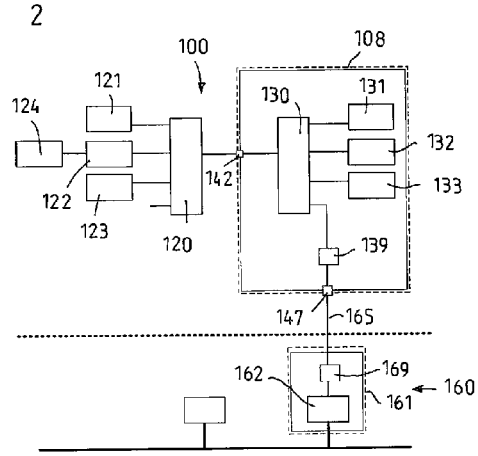
FIG. 3 shows the network infrastructure shown in FIG. 2 together with a static offboard control unit.

FIG. 3 shows the same network infrastructure 100 as described with reference to FIG. 2, the machine which carries along the controllers 120, 130 and also the network participants 120-124, 130-133 being connected to a static offboard control unit 160 or control center, for example arranged above ground or in an underground section. The data communication between the not inherently safe controller 130 arranged in the pressure-resistant housing 108 and a control computer 162—possibly arranged in a pressure-resistant housing 161—of the control unit 160 is effected via a first data coupler 139 which is arranged in the housing 108 and a second data coupler 169 which is associated with the control computer 162. The data couplers 139, 169 can be used to transmit the entire data interchange, again via an optical waveguide cable 165, as shown. For the optical waveguide transmission, the data couplers 139, 169 are preferably long-distance data couplers. The optical waveguide cable 165 can be routed into the housing 108 which is moved along on the mobile machine via a further pressure-resistant bushing 147. Alternatively, the data interchange could also take place by radio or via an electrically conductive, in particular copper-based, cable, however, in which case the two data couplers 139, 169 together form isolation couplers or barriers.

Figure 4:
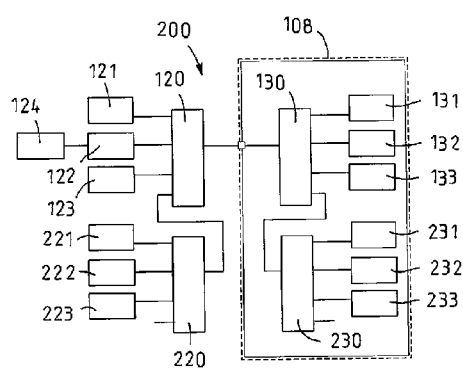
FIG. 4 shows expansion options for the network infrastructure shown in FIG. 2 by way of example.

FIG. 4 shows a network structure 200 which is of essentially the same design as the network structure 100 and is provided with a first not inherently safe controller 130, arranged in a housing 108, with the data distributor function for a plurality of not inherently safe network participants 131-133, which are likewise arranged in the pressure-resistant housing 108, and which comprises a second, inherently safe controller 120 which forms a data distributor for a plurality of inherently safe network participants 121-124. In the exemplary embodiment shown in FIG. 4, the pressure-resistant housing 108 contains an additional, not inherently safe, third controller 230 having a plurality of connected not inherently safe network participants 231, 232, 233, said third controller being connected to the first, not inherently safe controller 130. In addition, a suitable output of the second controller 120 has a separate, inherently safe controller 220 connected to it which in turn has further inherently safe network participants 221, 222, 223, etc., connected to it. It goes without saying that both the inherently safe controllers 120, 220 and the not inherently safe controllers 130, 230 can have further controllers connected to them in order to extend the network infrastructure 200 depending on the requirements profile. It also goes without saying that, by way of example, only one inherently safe controller 120 and a plurality of not inherently safe controllers 130, 230, or vice versa, could be provided, and the not inherently safe controllers could be arranged in the same pressure-resistant housing 108 or else in different pressure-resistant housings.

Figure 5:
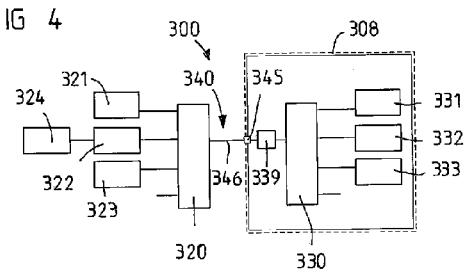
FIG. 5 shows a network infrastructure based on a third exemplary embodiment.

FIG. 5 shows a network infrastructure 300 for an embodiment with an electrically conductive, preferably copper-based cable 346 as a data communication link 340. In order for the not inherently safe network participants 331, 332, 333 which are arranged in the pressure-resistant housing 308 and for the not inherently safe controller 330 to be DC-isolated from the network participants in the area at risk of explosion despite the cable bushing 345 for the copper cable 346, and to obtain the approval for the area at risk of explosion, the not inherently safe controller 330 has an isolation coupler 339 connected upstream of it as a DC-isolating barrier. Both the not inherently safe controller 330 and the inherently safe controller 320 for the associated network participants 321-324 form data distributors, as a result of which the individual inherently safe network participants 321-324 and also the not inherently safe network participants 331-333 can communicate or interchange data with one another arbitrarily.

Figure 6:
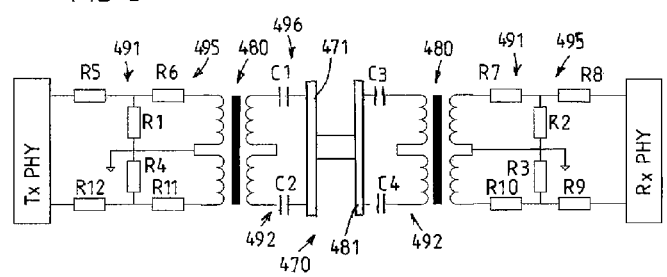
FIG. 6 shows a possible exemplary embodiment of a network interface for bidirectional, copper-based data communication between inherently safe network participants.

FIG. 6 shows an example of a network interface for an inherently safe data transmission in one signal direction, said network interface being denoted as a whole by reference symbol 470, advantageously being able to be used at least for the inherently safe network participants, and meeting requirements for protection against explosion. For the bidirectional data transmission, each network interface has each network connection connector provided both with a receiver portion and with a transmitter portion and possibly also with additional power supply pins. That circuit portion of the network interface 470 which is shown in the left-hand half forms a transmitter portion with the Tx-PHY semiconductor component, and the right-hand circuit portion forms a receiver portion of the network interface with the Rx-PHY semiconductor component. Between the PHY semiconductor chips and the connector connections 471 and 481—indicated only in part—there is a respective transmission element 480, which may comprise a core with windings arranged thereon, in a manner known per se, as is known to a person skilled in the art for the design of appropriate network interfaces, particularly interfaces for the Ethernet protocol. The network interface 470 for use in areas at risk of explosion has a circuit stage 491 at the electronics end between the transmission element 480 and the Tx-PHY at the transmitter end or the Rx-PHY at the receiver end, respectively. The PHYs are each associated with the associated electronics (not shown) of an inherently safe network participant or of the inherently safe controller. In addition, the transmission element 491 and the connector connection 471 at the transmitter output or 481 at the connector input to the receiver portion have a circuit stage 492 at the connector connection end arranged between them. As illustrated, each of the electronics-end circuit stages 491 comprises a resistor network which is denoted as a whole by reference symbol 495, while the connector-connection-end circuit stage 492 is provided with a capacitor network 496, in this case comprising the two capacitors C1, C2 in the transmitter portion and the two capacitors C3, C4 in the receiver portion. Although the figures show only respective capacitors C1, C2, C3, C4 in each signal path in the capacitor network 496, for reasons of redundancy the capacitors should preferably be of doubled design and they may each comprise two series-connected capacitances so that, in the event of an error, if one capacitor C1, C2, C3, C4 is shorted, it is nevertheless possible for the second, series-connected capacitor still to provide the power decoupling. Since each transmission link or each signal path with at least one capacitor C1, C2, C3, C4 contains a capacitance, a safe assurance is provided that no DC power can be transmitted. The capacitances should be chosen to be as small as possible, including to minimize the physical size, but the RF signal to be transmitted needs to be subjected to as little interference as possible so that even a 100-Mbit signal can be transmitted and received without interference. To this end, the capacitors in each transmission path may together have capacitances of approximately 16 nF or else greater, for example.

In order to achieve a 100-Mbit transmission rate for an inherently safe Ethernet interface, each transmission element 490 in each signal path for the transmission link has two resistors R5, R6, R7, R8, R9, R10 and also R11, R12 arranged upstream of it as components of the resistor network 495, which limit the power of the radio-frequency signal so that arbitrary and an arbitrary number of appliances with this interface specification (point-to-point connection) can be connected together in inherently safe network topologies. Said resistors R5 to R16 in the resistor network 495 ensure that the power coupling is limited in relation to the RF power (radio-frequency AC voltage power), particularly in combination with an inherently safe power supply for the transmitter semiconductor chips Tx-PHY and the receiver semiconductor chips Rx-PHY. In addition, the resistor network 495 also contains the resistors R1, R2, R3, R4, as is also known for a "conventional" Ethernet network interface. The arrangement of the resistors means that each resistor network 495 is in the form of a 2-gate network both for the transmitter portion with the associated Tx-PHY and for the receiver portion with the associated Rx-PHY, the resistor networks 495 being dimensioned such that a terminating impedance $Z_0$ of approximately 100Ω in each case exists and at the same time RF power limiting is made possible. The resistors R5 to R16 may be of 3Ω design and the resistors R1 to R4 may be of 47Ω design, for example. The resistor dimensioning should be chosen such that firstly adequate RF power limiting is achieved and at the same time the damping losses do not become too great. At maximum voltage for the individual PHY semiconductor chips of approximately 2.7 Volts, for example, the total power in the signal paths can therefore be kept below an upper limit in order to meet the requirements for protection against explosion.

For a person skilled in the art, numerous modifications which are meant to fall within the scope of protection of the appended claims arise from the preceding description. The mobile machine for areas at risk of explosion may also comprise a tunnelling machine, a shearer loader, a tractor loader, a dumper, a forklift truck, a transportation vehicle for shield-type support cages, a passenger transportation vehicle or else an overhead monorail, for example, in so far as these can be used in areas at risk of explosion and are accordingly (also) provided with inherently safe network participants. The controllers forming the data distributors, and also all network participants, can preferably communicate with one another in a dedicated address range, the entire network infrastructure being screened from the outside by means of one of the two data distributors, preferably the not inherently safe network distributor. With explicit authorizations, access from or to the outside can be granted or denied. The data distributors and all the network participants can also act in the same address range as the mine, and any network participant is for its part able to connect or disconnect communication with other network participants, possibly at any time. A network infrastructure according to the invention can, in principle, grow arbitrarily by virtue of the concatenation of further network participants in a linear structure or ring structure, with the first data distributor, arranged in the pressure-resistant housing, and the second, inherently safe data distributor allowing extension in one or other area independently of one another in the area at risk of explosion.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A network infrastructure for one or more mobile machines which are usable in areas at risk of explosion, each mobile machine comprising one or more inherently safe participants and one or more not inherently safe participants which are arranged in pressure-resistant housings, wherein the network infrastructure comprises:

at least one first controller, arranged in a pressure-resistant housing, configured to actuate the one or more not inherently safe participants of a first mobile machine of the one or more mobile machines; and at least one second controller disposed outside of the pressure-resistant housing for the at least one first controller and configured to actuate the one or more inherently safe participants of the first mobile machine;

wherein the at least one first controller forms a first data distributor for the one or more not inherently safe participants and the at least one second controller forms a second data distributor for the one or more inherently safe participants;

wherein the first data distributor and the second data distributor have an electrically decoupled data communication link between them; and wherein the at least one first controller and the at least one second controller are both mounted within or on the first mobile machine and configured to be operated within the areas at risk of explosion.

2. The network infrastructure according to claim 1, wherein the electrically decoupled data communication link comprises at least one of a glass-fibre line or an optical waveguide.

3. The network infrastructure according to claim 1, wherein the electrically decoupled data communication link for the at least one second controller is led through the pressure-resistant housing for housing the first controller via a single pressure-resistant outlet.

4. The network infrastructure according to claim 1, wherein the at least one first controller has a not inherently safe network participant connected to it which is arranged in a separate pressure-resistant housing.

5. The network infrastructure according to claim 1, wherein the at least one second controller has exclusively inherently safe network participants connected to it.

6. The network infrastructure according to claim 1, wherein the at least one second controller is in the form of an inherently safe network switch having combined data and power-supply connections.

7. The network infrastructure according to claim 1, wherein the at least one first controller is at least two first controllers that are connectable to each other, and the at least two first controllers each being arranged in a pressure-resistant housing and each having data distributor functions.

8. The network infrastructure according to claim 7, wherein the at least one second controller is at least two second controllers that are connectable to each other, and the at least two first controllers each having data distributor functions.

9. The network infrastructure according to claim 1, wherein the at least one second controller is at least two second controllers that are connectable to each other, and the at least two second controllers each having data distributor functions.

10. The network infrastructure according to claim 1, wherein the at least one first controller and the at least one second controller are each provided with at least one microprocessor for data distributor functions.

11. The network infrastructure according to claim 1, wherein the at least one inherently safe network participants and the at least one not inherently safe network participants communicate with one another in a dedicated address range.

12. The network infrastructure according to claim 1, wherein the at least one first controller is connected to a static offboard control unit via a data coupler for the purpose of data interchange.

13. A controller system for a mobile machine configured to be operated within an area at risk of explosion, the controller system comprising:

at least one first controller disposed within a first pressure-resistant housing and configured to actuate one or more not inherently safe participants of the mobile machine, wherein each of the not inherently safe participants is disposed within at least one of the first pressure-resistant housing or one or more second pressure-resistant housings, wherein the at least one first controller is configured to distribute data between the one or more not inherently safe participants; and at least one second controller disposed outside of the first pressure-resistant housing and configured to actuate one or more inherently safe participants of the mobile machine, wherein the at least one second controller is configured to distribute data between the one or more inherently safe participants;

wherein the at least one first controller and the at least one second controller are configured to communicate via an electrically decoupled data communication link; and wherein the at least one first controller and the at least one second controller are both mounted within or on the mobile machine and configured to be operated within the area at risk of explosion.

14. The controller system according to claim 13, wherein the electrically decoupled data communication link comprises at least one of a glass-fibre line or an optical waveguide.

15. The controller system according to claim 13, wherein the electrically decoupled data communication link is led through the first pressure-resistant housing via a single pressure-resistant outlet.

16. A mobile machine configured to be operated within an area at risk of explosion, the mobile machine comprising:

one or more inherently safe participants configured for safe operation within the area at risk of explosion;

one or more not inherently safe participants;

a housing;

at least one first controller disposed within a first pressure-resistant housing and configured to actuate the one or more not inherently safe participants the mobile machine, wherein each of the not inherently safe network participants is disposed within at least one of the first pressure-resistant housing or one or more second pressure-resistant housings, wherein the at least one first controller is configured to distribute data between the one or more not inherently safe participants; and at least one second controller disposed outside of the first pressure-resistant housing and configured to actuate the one or more inherently safe participants of the mobile machine, wherein the at least one second controller is configured to distribute data between the one or more inherently safe participants; and an electrically decoupled data communication link configured to provide communication between the at least one first controller and the at least one second controller;

wherein the at least one first controller and the at least one second controller are both mounted within or on the housing of the mobile machine and configured to be operated within the area at risk of explosion; and wherein the mobile machine is configured to move within the area at risk of explosion and perform one or more functions within the area at risk of explosion.

17. The mobile machine according to claim 16, wherein the electrically decoupled data communication link comprises at least one of a glass-fibre line or an optical waveguide.

18. The mobile machine according to claim 16, wherein the electrically decoupled data communication link is led through the first pressure-resistant housing via a single pressure-resistant outlet.

19. The mobile machine according to claim 16, wherein the mobile machine comprises a mining machine.

* * * * *

UNITED STATES PATENT AND TRADEMARK OFFICE
CERTIFICATE OF CORRECTION

| | |
|---|---|
| PATENT NO. | : 8,804,855 B2 |
| APPLICATION NO. | : 13/581458 |
| DATED | : August 12, 2014 |
| INVENTOR(S) | : Lenzing et al. |

It is certified that error appears in the above-identified patent and that said Letters Patent is hereby corrected as shown below:

In the Specification

Column 4 line 48, delete "controller" and insert -- controller 30 --.

Signed and Sealed this
Fifteenth Day of September, 2015

Michelle K. Lee
*Director of the United States Patent and Trademark Office*